Patented Jan. 6, 1925.

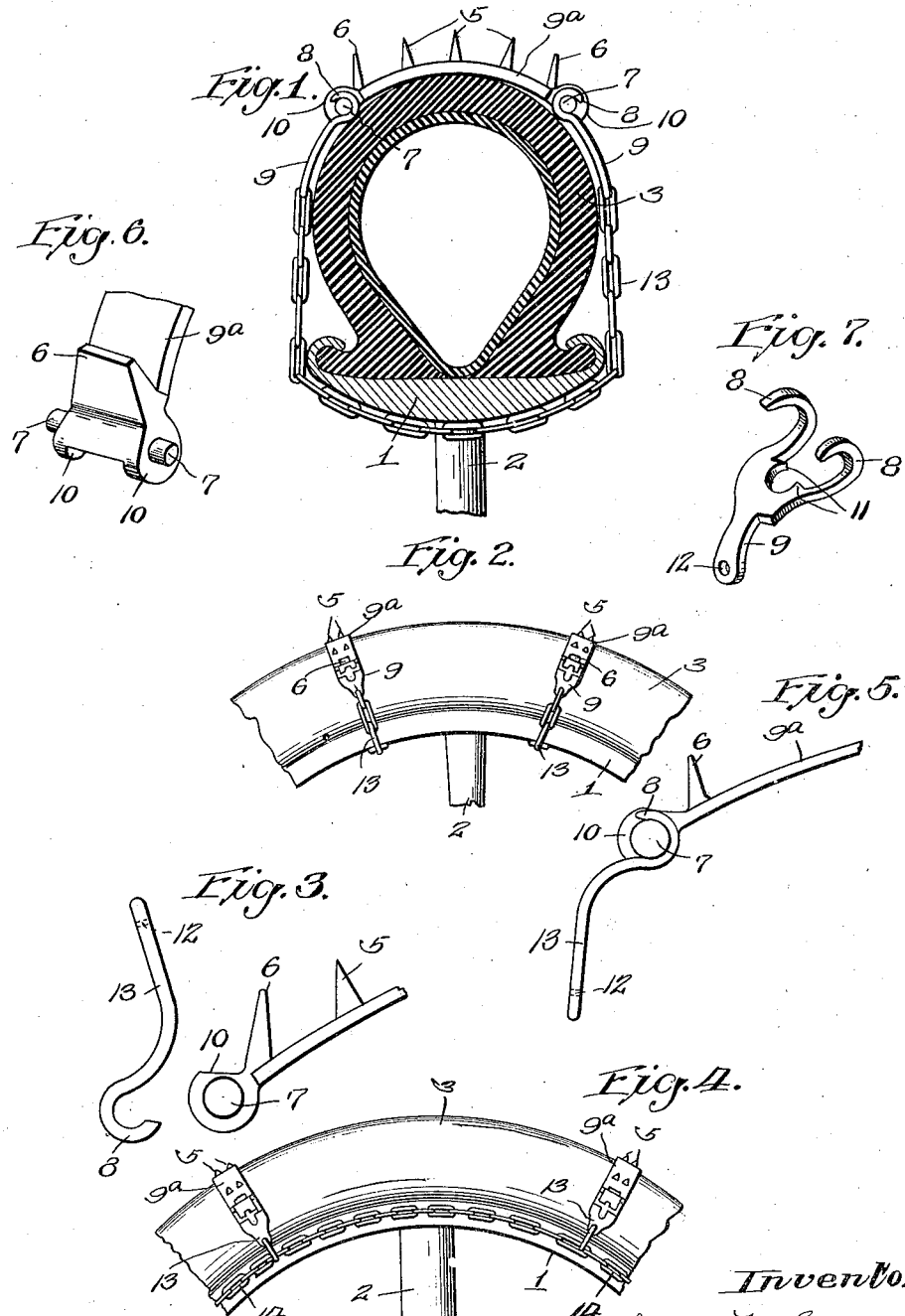

1,522,052

UNITED STATES PATENT OFFICE.

JAMES M. GREEN, OF CHICAGO, ILLINOIS.

MUD SHOE FOR AUTOMOBILE TIRES AND THE LIKE.

Application filed October 3, 1922. Serial No. 592,132.

*To all whom it may concern:*

Be it known that I, JAMES M. GREEN, a citizen of the United States, residing at the city of Chicago, in the county of Cook and State of Illinois, have invented certain new and useful Improvements in Mud Shoes for Automobile Tires and the like, of which the following is a specification.

My invention relates to devices for attachment to automobile tires and the like, to increase the traction, and also to prevent sliding or skidding in wet weather, or on slippery road beds, or in soft or muddy roads, or in snow and slush.

The primary object of my invention is to provide a detachable non-skidding device, which may be easily and quickly attached to the tire, or removed therefrom, and which will increase the traction of the tire on the road bed, and will also decrease the slipping, or skidding of the tire on wet or slippery road beds.

Another object is to provide such a non-skid device that can be securely locked in place about the tire, and will not become detached accidentally.

Another object is to provide such a non-skid attachment that will have suitable projections for engaging the pavement or road bed to assist in traction or non-skidding when in use.

With the above and other objects in view, which will be more particularly set forth in the accompanying specification, my invention consists of the parts and arrangement of parts as illustrated and shown in the accompanying drawings, and in which like numerals of reference indicate like parts throughout the several views, and in which, Figure 1 is a section view showing the tire, and rim of the wheel, with my invention attached.

Figure 2 is a side elevation of a portion of an automobile wheel, showing two of my non-skid devices attached thereto.

Figure 3 is a detail view showing the means employed by me to engage and lock the parts against accidental displacement when upon the wheel the parts being shown separated.

Figure 4 is a view showing my device as attached to the tire by means of parallel side chains.

Figure 5 is a detail view showing the same parts as in Figure 3, but in engagement as employed on the tire.

Figure 6 is a detail perspective view of one end of the mud-shoe.

Figure 7 is a detail perspective view of one of the end pieces employed to engage the end of the mud shoe shown in Figure 6.

In the drawings accompanying this specification, I have shown my device as attached to a pneumatic tire upon a rim 1 of any usual wheel. Part of a spoke as 2 is shown extending toward the hub (not shown.) The inner side of my non-skid device 4 is curved to conform to the curvature of a cross section of the tire 3, and is made comparatively smooth on the inner side to prevent wear of the tire by contact therewith. At suitable locations upon the outer surface of my said device, I have provided outwardly extending lugs or spikes, as 5, 5 to more firmly engage the road bed as the wheel is rotated in use, while at the portions 6, 6 I have provided two additional lugs projecting outwardly, as shown, having rectangular cross section, and disposed with the long way of the rectangle in the direction of travel of the wheel, for the purpose of engaging the road bed, and preventing the wheel from side slipping, or skidding sidewise. At each end of the central portion of my device $9^a$, I have provided the pins 7, 7, designed to engage the hooks 8, 8 on the connecting end pieces 9, 9, and I have further provided the circular shoulders 10, 10 at each end of the central portion of my device, which are adapted to engage the cross portions 11, 11 on the end pieces, and lock said end pieces in fixed engagement with the central portion whenever in position about the tire, against any possibility of accidental disengagement of the hooks 8, 8 with the pins 7, 7 with which they have been engaged.

At the free end of each of the end pieces 9, 9 I have provided holes as 12, 12 for engaging a hook on the end of the chain 13, 13 extending around under the rim, and the hook on the farther end engaging the end piece on the farther side of the central piece. By this means each device may be engaged around the tire and rim, and locked in place for use in operation of the tire.

In Fig. 4 I have shown a variation of the method of attaching my non-skid device to the tire, by showing it as attached to side chains, as 14, 14 running around the tire parallel with the inner circumference. By this means the parts may be equally spaced about the tire, and all attached at one time.

Having thus described my invention, what I claim, and desire to secure by Letters Patent, is the following:—

1. In a device of the class described, the combination of a central member having outwardly extending projections and pins at its respective ends, end pieces having open eyes at one end thereof adapted to engage removably the pins on the central member, and a chain section for connecting the free ends of the end pieces, substantially as shown, and for the purposes described.

2. In a device of the class described, the combination of a curved central member adapted to fit over the tread of an automobile tire or the like, said member having outwardly projecting spikes at various portions of its surface, and laterally extending integral pins at its extremities, with rounded shoulders adjoining said pins; end members each consisting of a curved portion, with open hooks at one end for engagement with the pins on the central member, and laterally extending shoulders between said hooks for engagement with the rounded shoulders upon the central member, and means for holding said members in position against the tread of an automobile tire and the like.

3. In a device of the character described comprising a curved central member adapted to fit over the tire tread and having spikes thereon to engage the ground, laterally extending pins integral with the ends of the central member and extending from both sides, thereof, the said central member having spaced rounded shoulders at each side of the ends thereof, curved end members provided with hooks removably engaging the laterally extending pins and having bearing surfaces lying between the hooks and extending inwardly therefrom to engage the rounded shoulders of the central member when in position on the tire, and means for securing the device to the tire.

In witness whereof, I have hereunto signed my name.

JAMES M. GREEN.